US008630541B2

(12) United States Patent
Kawasaki

(10) Patent No.: US 8,630,541 B2
(45) Date of Patent: Jan. 14, 2014

(54) WAVELENGTH DIVISION MULTIPLEXING TRANSMISSION APPARATUS FOR CONTROLLING THE WAVELENGTH OF AN FBTL OPTICAL MODULE, AND WAVELENGTH CONTROL METHOD EMPLOYED FOR WAVELENGTH DIVISION MULTIPLEXING TRANSMISSION APPARATUS EQUIPPED WITH THE FBTL OPTICAL MODULE

(75) Inventor: Wataru Kawasaki, Kawasaki (JP)

(73) Assignee: Fujitsu Telecom Networks Limited (JP)

( * ) Notice: Subject to any disclaimer, the term of this patent is extended or adjusted under 35 U.S.C. 154(b) by 253 days.

(21) Appl. No.: 13/127,205

(22) PCT Filed: Dec. 18, 2008

(86) PCT No.: PCT/JP2008/003841
§ 371 (c)(1),
(2), (4) Date: May 2, 2011

(87) PCT Pub. No.: WO2010/070709
PCT Pub. Date: Jun. 24, 2010

(65) Prior Publication Data
US 2011/0211831 A1    Sep. 1, 2011

(51) Int. Cl.
*H04J 14/00* (2006.01)
(52) U.S. Cl.
USPC .................. 398/69; 398/68; 398/70; 398/71
(58) Field of Classification Search
USPC .................. 398/128, 69, 130, 79, 34
See application file for complete search history.

(56) References Cited

U.S. PATENT DOCUMENTS 6,718,140 B1 *   4/2004   Kamei et al. .................... 398/68
7,471,899 B2 *  12/2008   Kim et al. ....................... 398/69
(Continued)

FOREIGN PATENT DOCUMENTS

| JP | 11-146343 | 5/1999 |
| JP | 2001-217901 | 8/2001 |

(Continued)

OTHER PUBLICATIONS

Fujisaku et al; 10Bbit/s full-band tunable optical transponder;pp. 16-19 provided in the IDS.*

(Continued)

*Primary Examiner* — Ken Vanderpuye
*Assistant Examiner* — Amritbir Sandhu
(74) *Attorney, Agent, or Firm* — Christie, Parker & Hale, LLP

(57) ABSTRACT

Provided is a wavelength division multiplexing transmission apparatus that enables operation control of transponders each carrying an FBTL optical module from the monitoring control unit by the same operation control as one for the transponders each carrying an NB optical module with four wavelengths assigned. For that purpose, the wavelength division multiplexing transmission apparatus includes the transponders for converting optical signals from wideband wavelengths to narrowband wavelengths, and a monitoring control unit for controlling the transponders by instructions from an operator. Each transponder includes (i) an assigned wavelength determining unit for converting channel information specified by the monitoring control unit into assigned wavelength information assigned to the transponder, and (ii) a full-band tunable laser (FBTL) module control unit for performing control in such a manner as to cause a full-band tunable laser (FBTL) to emit based on the assigned wavelength information after conversion by the assigned wavelength determining unit.

2 Claims, 10 Drawing Sheets

(56) References Cited

U.S. PATENT DOCUMENTS

| | | | |
|---|---|---|---|
| 7,502,563 B2* | 3/2009 | Nozue et al. | 398/69 |
| 7,738,790 B2* | 6/2010 | Nozue et al. | 398/69 |
| 7,917,033 B2* | 3/2011 | Sakata et al. | 398/79 |
| 2006/0104640 A1* | 5/2006 | Kunimatsu et al. | 398/79 |
| 2007/0077072 A1* | 4/2007 | Kunimatsu et al. | 398/135 |
| 2008/0025727 A1* | 1/2008 | Sakata et al. | 398/79 |
| 2009/0080889 A1* | 3/2009 | Nozue et al. | 398/69 |
| 2009/0110400 A1* | 4/2009 | Nozue et al. | 398/71 |

FOREIGN PATENT DOCUMENTS

| | | |
|---|---|---|
| JP | 2004-274113 | 9/2004 |
| JP | 2005-277686 | 10/2005 |
| JP | 2007097067 A * | 4/2007 |
| JP | 2007-208499 | 8/2007 |
| JP | 2008-028928 | 2/2008 |
| WO | WO 2010070709 A1 * | 6/2010 |

OTHER PUBLICATIONS

Japanese Office Action dated Jun. 19, 2012 for corresponding Japanese Patent Application No. 2010-542746, and English translation, 5 pages.

Ishikawa et al., "High-Power Single-Stripe Full-Band Tunable Laser Using Tunable Reflector with Wavelength-Filter Function," The Institute of Electronics, Information and Communication Engineers, IEICE Technical Report, vol. 108, No. 114, LQE2008-30, pp. 51-56, Jun. 2008.

Fujisaku, Y., et al., 10Gbit/s Full-Band Tunable Optical Transponder, Oct. 2006, pp. 16-19, with summary translation in English (1 page).

Japanese International Search Report dated Jan. 27, 2009 for Application No. PCT/JP2008/003841 with English translation (4 pages).

Japanese International Preliminary Report on Patentability dated Jun. 21, 2011 for Application No. PCT/JP2008/003841 with English translation, 11 pages.

* cited by examiner

FIG.3

| WAVELENGTH SET | TRANSPONDER TO BE CONTROLLED | CH SET |
|---|---|---|
| WAVELENGTH 1 | TRANSPONDER 1 | CH1 |
| WAVELENGTH 2 | TRANSPONDER 1 | CH2 |
| WAVELENGTH 3 | TRANSPONDER 1 | CH3 |
| WAVELENGTH 4 | TRANSPONDER 1 | CH4 |
| WAVELENGTH 5 | TRANSPONDER 2 | CH1 |
| WAVELENGTH 6 | TRANSPONDER 2 | CH2 |
| WAVELENGTH 7 | TRANSPONDER 2 | CH3 |
| WAVELENGTH 8 | TRANSPONDER 2 | CH4 |
| ⋮ | ⋮ | ⋮ |
| WAVELENGTH 33 | TRANSPONDER 9 | CH1 |
| WAVELENGTH 34 | TRANSPONDER 9 | CH2 |
| WAVELENGTH 35 | TRANSPONDER 9 | CH3 |
| WAVELENGTH 36 | TRANSPONDER 9 | CH4 |
| WAVELENGTH 37 | TRANSPONDER 10 | CH1 |
| WAVELENGTH 38 | TRANSPONDER 10 | CH2 |
| WAVELENGTH 39 | TRANSPONDER 10 | CH3 |
| WAVELENGTH 40 | TRANSPONDER 10 | CH4 |

WAVELENGTH DIVISION MULTIPLEXING TRANSMISSION APPARATUS FOR CONTROLLING THE WAVELENGTH OF AN FBTL OPTICAL MODULE, AND WAVELENGTH CONTROL METHOD EMPLOYED FOR WAVELENGTH DIVISION MULTIPLEXING TRANSMISSION APPARATUS EQUIPPED WITH THE FBTL OPTICAL MODULE

CROSS-REFERENCE TO RELATED APPLICATION

This application is a National Phase Patent Application and claims the benefit of and priority to International Application Number PCT/JP2008/003841, filed on Dec. 18, 2008.

TECHNICAL FIELD

The present invention relates to a wavelength division multiplexing (WDM) transmission apparatus for outputting light of predetermined wavelengths and a wavelength control method employed for a wavelength division multiplexing transmission apparatus for outputting light of predetermined wavelengths.

BACKGROUND TECHNOLOGY

Until now, the narrowband (hereinafter referred to as "NB" as appropriate) module supported, for example, four wavelengths out of the wavelengths (defined at 50 GHz spacing in each of the C band and the L band) recommended by the International Telecommunication Union (ITU). Therefore, when 40 wavelengths were to be handled by a single transmission apparatus, for instance, it was necessary to prepare ten kinds of NB optical modules (10 kinds×4 wavelengths=40 wavelengths).

In other words, such a demand was met by structuring a wavelength division multiplexing (WDM) transmission apparatus equipped with ten transponders which carry ten kinds of NB modules capable of outputting mutually different wavelengths. In recent years, however, the NB optical module equipped with a full-band tunable laser (hereinafter referred to as FBTL as appropriate) capable of supporting all the wavelengths to be handled by the transmission apparatus (hereinafter referred to as FBTL optical module as appropriate) has been developed, and thus the use of the conventional NB optical module responding to four wavelengths only is coming to an end.

Also, a problem with the 4-wavelength NB optical module has been that, despite a long time it takes to supply it (several months, for instance), the manufacture of it cannot be arranged until instructions on a specific wavelength range to be used are received from a client (until the order for definite wavelengths).

In this regard, the FBTL optical module allows ex-post tuning to all the wavelength bands which the transmission apparatus is supposed to use even when specific information on the wavelength bands is not available in advance. Therefore, the FBTL optical module has its merit in that the arrangement for supply can be started on the information of the required quantity of the module only.

For the existing wavelength division multiplexing (WDM) transmission apparatuses, software for controlling a transponder having a 4-wavelength NB optical module is already in operation with much accumulated control know-how. Even when such a transponder begins to carry the FBTL optical module, there is a practical limitation that no change in the monitoring control unit (typically the control program software for the monitoring control unit) is desired in view of maintaining compatibility with the current wavelength division multiplexing transmission apparatuses already on the market.

Thus, it is desired that even for the wavelength division multiplexing transmission apparatus carrying an FBTL optical module, the monitoring control unit thereof can perform control of the FBTL optical module by the same operation control as one for the conventional NB optical module with four wavelengths assigned.

Non-patent-related Document
(1) Yoshiharu Fujisaku, et al., "10 Gbit/s Full-Band Tunable Optical Transponder", Fujikura Technical Journal No. 111, pp. 16-19, October, 2006.

DISCLOSURE OF THE INVENTION

Problems to be Solved by the Invention

A purpose of the present invention is to provide a wavelength division multiplexing (WDM) transmission apparatus that enables operation control of the transponder carrying an FBTL optical module from the monitoring control unit by the same operation control as one for the transponder carrying an NB optical module with four wavelengths assigned.

Means for Solving the Problems

A wavelength division multiplexing transmission apparatus according to one embodiment of the present invention includes (i) a plurality of transponders for converting optical signals from wideband wavelengths to narrowband wavelengths, and (ii) a monitoring control unit for controlling the transponders, and each of the transponders comprises: an assigned wavelength determining unit configured to convert channel information specified by the monitoring control unit to assigned wavelength information assigned to the transponder; and a full-band tunable laser (FBTL) optical module control unit configured to control a full-band tunable laser (FBTL) optical module in such a manner as to output the optical signal, based on the assigned wavelength information after conversion by the assigned wavelength determining unit.

Also, in a wavelength division multiplexing transmission apparatus according to one embodiment of the present invention, the transponders are each provided preferably with a physical inventory (PI) storage in which assigned wavelength information is recorded in advance, and when the monitoring control unit reads the assigned wavelength information from the PI storage, the assigned wavelength determining unit may associate the channel information with the assigned wavelength information by acquiring the read-out assigned wavelength information.

Also, in a wavelength division multiplexing transmission apparatus according to another embodiment of the present invention, the transponders are each provided preferably with a physical inventory (PI) storage in which the assigned wavelength information is recorded in advance, and when the transponder is started up, the assigned wavelength determining unit may associate the channel information with the assigned wavelength information by reading the assigned wavelength information from the PI storage.

Also, in a wavelength division multiplexing transmission apparatus according to another embodiment of the present invention, more preferably, the assigned wavelength determining unit may acquire the assigned wavelength information by reading the assigned wavelength information from the PI storage and then the monitoring control unit may read the assigned wavelength information from the PI storage so that there occurs no overlapping of read accesses to the PI storage by the monitoring control unit and the assigned wavelength determining unit.

Still another embodiment of the present invention relates to a method for controlling a wavelength of a wavelength division multiplexing transmission apparatus including (i) a plurality of transponders for converting optical signals from wideband wavelengths to narrowband wavelengths and (ii) a monitoring control unit for controlling the transponders. The method comprises: an assigned wavelength determining process of converting channel information specified by the monitoring control unit to assigned wavelength information assigned to the transponder, the assigned wavelength determining process being performed by each of the transponders, and a full-band tunable laser (FBTL) optical module control process of controlling a full-band tunable laser (FBTL) optical module in such a manner as to output the optical signal, based on the assigned wavelength information after conversion in the assigned wavelength determining process, the FBTL optical module control process being performed by each of the transponders.

Also, in a method, for controlling a wavelength of a wavelength division multiplexing transmission apparatus, according to one embodiment of the present invention, the transponders are each provided preferably with a physical inventory (PI) storage in which assigned wavelength information is recorded in advance, and the method may further comprise: a process of reading the assigned wavelength information from the PI storage, performed by the monitoring control unit; and a process of acquiring the read-out assigned wavelength information read out by the monitoring control unit, in the reading process, so as to associate the channel information with the assigned wavelength information, performed by an assigned wavelength determining unit.

Also, in a method, for controlling a wavelength of a wavelength division multiplexing transmission apparatus, according to another embodiment of the present invention, the transponders are each provided preferably with a physical inventory (PI) storage in which the assigned wavelength information is recorded in advance, and the method may further comprise a process of reading the assigned wavelength information from the PI storage, performed by an assigned wavelength determining unit, when the transponder is started up, so as to associate the channel information with the assigned wavelength information.

Also, in a method, for controlling a wavelength of a wavelength division multiplexing transmission apparatus, according to another embodiment of the present invention, the method may further comprise: a first read process of acquiring the assigned wavelength information by reading the assigned wavelength information from the PI storage, performed by the assigned wavelength determining unit; and a second read process of reading the assigned wavelength information from the PI storage after the first read process, performed by the monitoring control unit.

Effect of the Invention

The present invention provides a wavelength division multiplexing transmission apparatus that enables operation control of the transponder carrying an FBTL optical module from the monitoring control unit by the same operation control as one for the transponder carrying an NB optical module with four wavelengths assigned.

BRIEF DESCRIPTION OF THE DRAWINGS

FIG. 3 is an explanatory diagram for showing an example of correspondence relationship between 40 wavelengths supported by a transmission apparatus, 10 transponders handling the 40 wavelengths which are divided into groups of 4 wavelengths, and 4 channels served by each of the transponders.

DESCRIPTION OF THE REFERENCE NUMERALS

Figure 1:
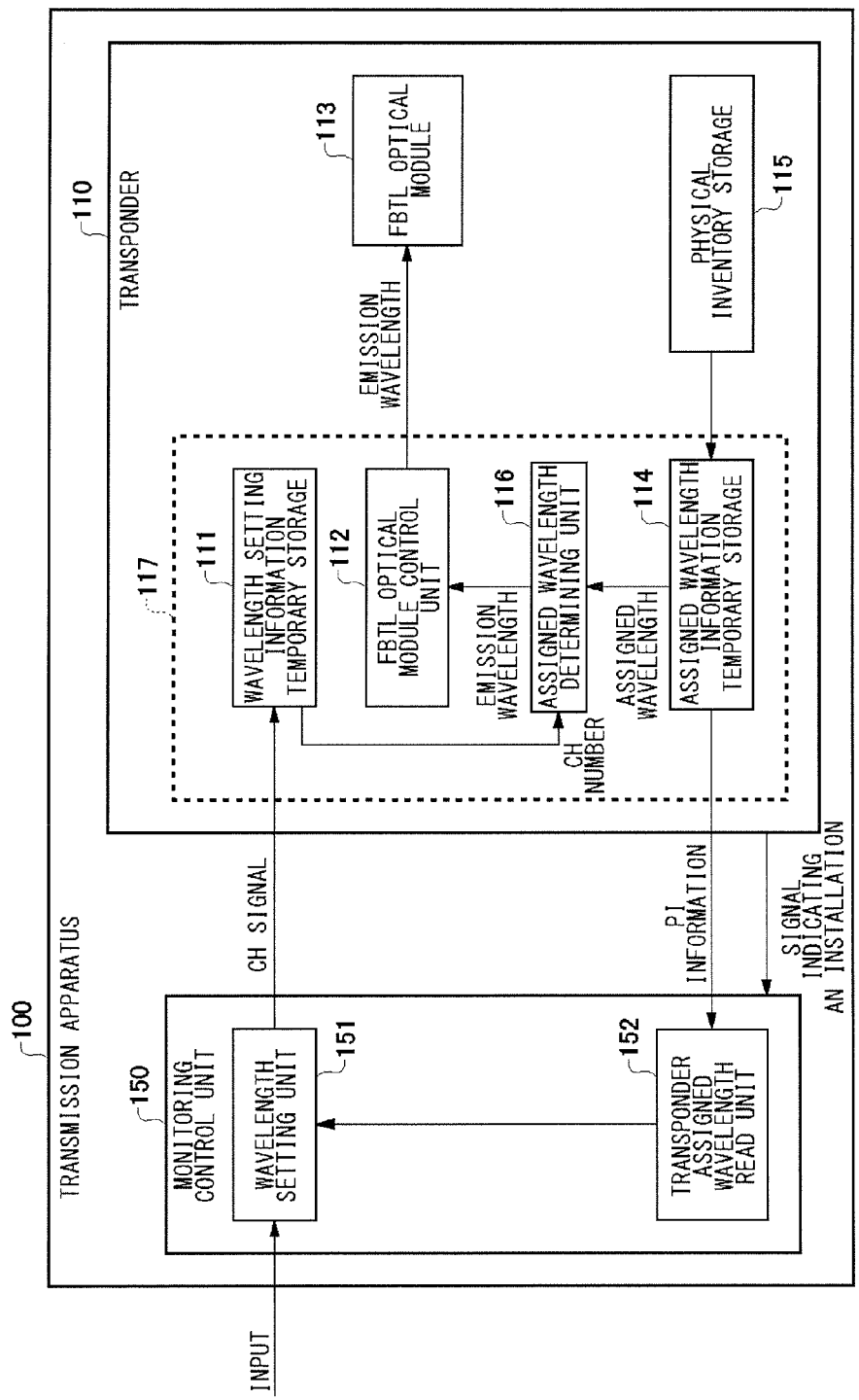
FIG. 1 is a block diagram conceptually showing a structure of a wavelength division multiplexing transmission apparatus according to a first embodiment.

110 Transmission apparatus
110 Transponder
111 Wavelength setting information temporary storage
112 FBTL optical module control unit
113 FBTL optical module
114 Assigned wavelength information storage
115 Physical inventory storage
116 Assigned wavelength determining unit
117 Device unit
150 Monitoring control unit
151 Wavelength setting unit
152 Transponder assigned wavelength read unit

BEST MODE FOR CARRYING OUT THE INVENTION

In a wavelength division multiplexing (hereinafter referred to as "WDM" as appropriate) transmission apparatus, a conversion processing that converts an optical signal of a wide band (a wide-band wavelength, hereinafter referred to as "WB" as appropriate) to an optical signal of a narrow band (narrow-band wavelength, hereinafter referred to as "NB" as appropriate) is carried out by a transponder as a preprocessing of the wavelength multiplexing.

Figure 9:
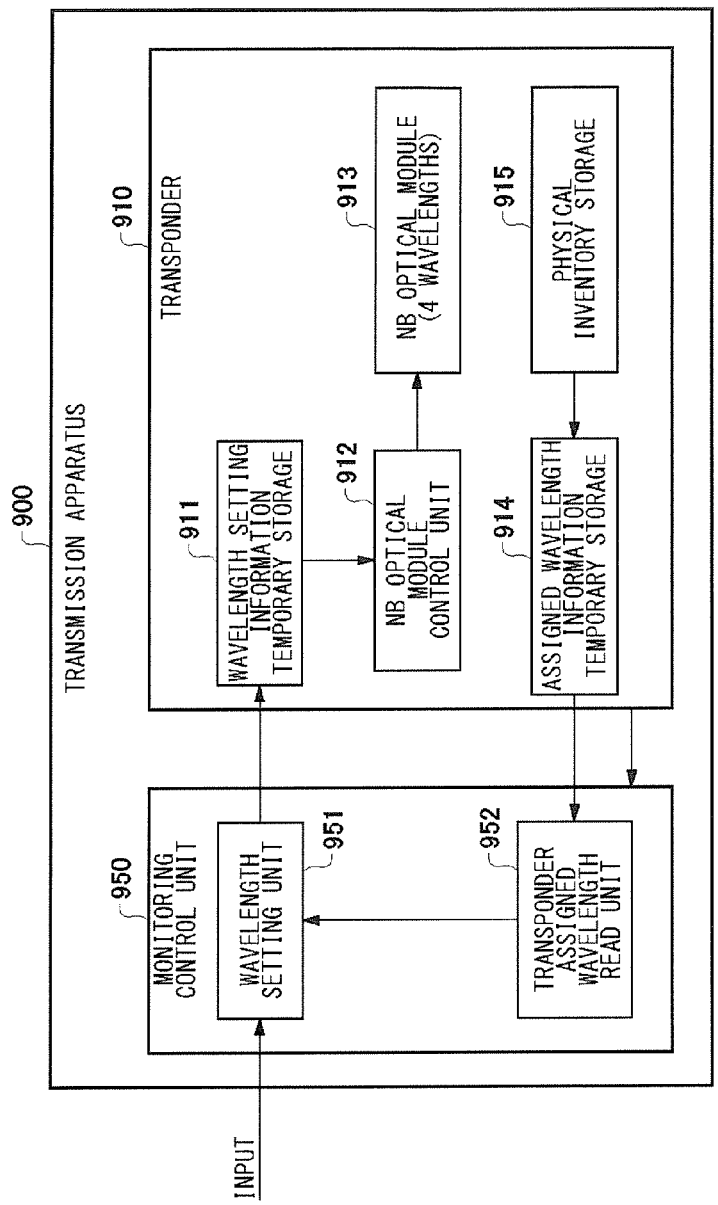
FIG. 9 is a conceptual block diagram for explaining a structure of a conventional wavelength division multiplexing transmission apparatus.
Figure 10:
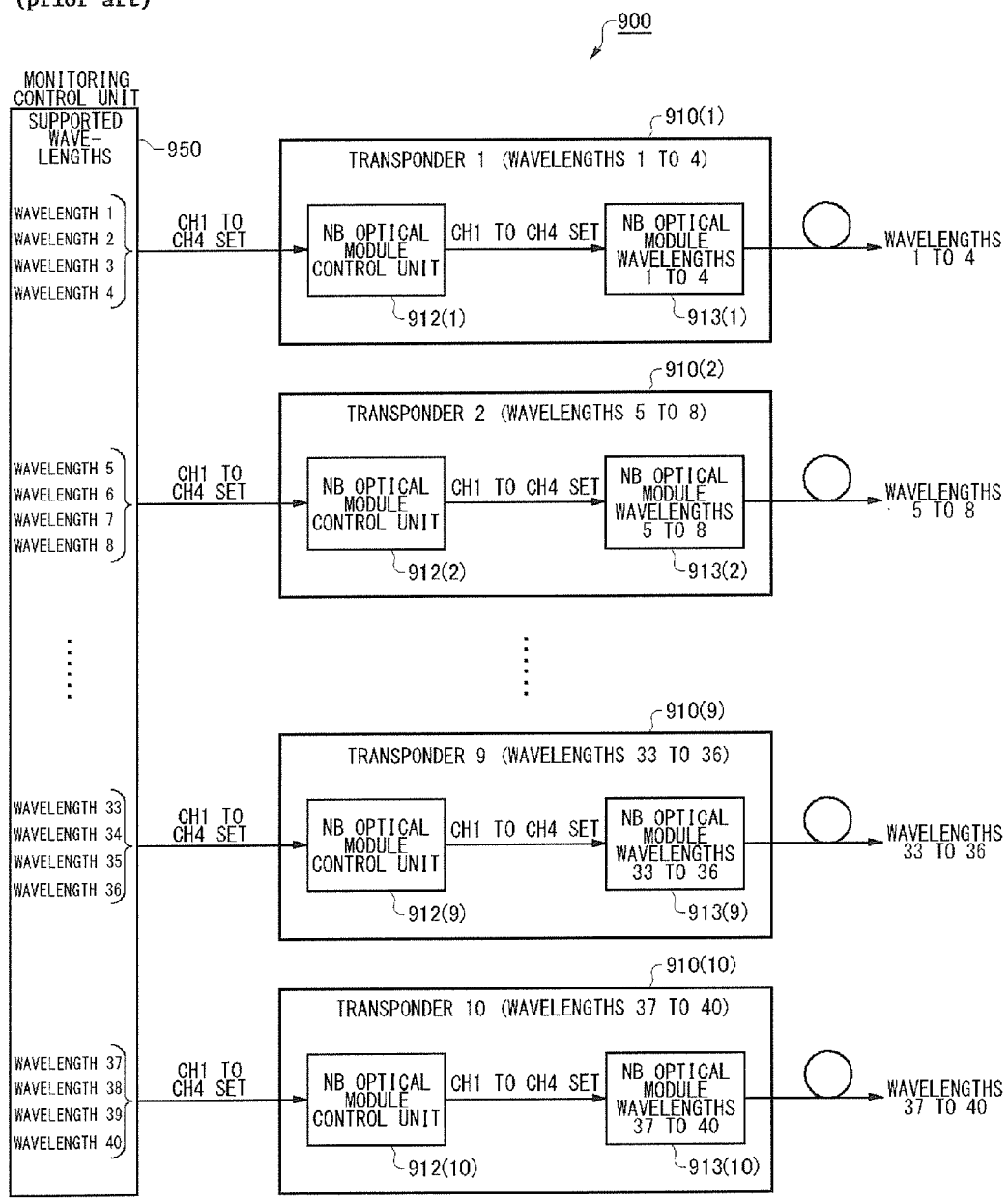
FIG. 10 is an overall conceptual block diagram for explaining a structure of the conventional wavelength division multiplexing transmission apparatus.

The present invention relates to a technique used to control the setting of wavelength of an NB optical conversion module (hereinafter referred to as "NB optical module" as appropriate). Now, an outline concerning an operation and a structure of a four-wavelength NB optical module will be first explained with reference to FIG. 9 and FIG. 10. FIG. 9 is a conceptual block diagram for explaining the structure of a conventional wavelength division multiplexing transmission apparatus. FIG. 10 is an overall conceptual block diagram for explaining the structure of the conventional wavelength division multiplexing transmission apparatus.

In conjunction with FIG. 9, a description is given of a single transponder only since the relationship between the transponder and the monitoring control unit is to be mainly explained here. As shown in FIG. 10, the WDM transmission apparatus has ten transponders, and each of the transponders is configured such that four different wavelengths can be outputted.

In FIG. 9, a transponder 910 sends a signal indicating its installation to a monitoring control unit 950 when the transponder 910 is mounted to a transmission apparatus 900 by plugging the transponder 910 into the transmission apparatus 900 or the like or when the power to the transponder 910 is turned on. The transponder 910 and the monitoring control unit 950 are typically installed attachably and detachably in a casing to constitute the transmission apparatus 900. Therefore, the transponder 910 and the monitoring control unit 950 communicate with each other via not-shown communication units provided respectively therefor.

Upon receipt of the signal of installation, the monitoring control unit 950 reads out physical inventory (PI) information, such as package names and assigned wavelengths, from a physical inventory (hereinafter referred to as "PI" as appropriate) storage 915 provided in the transponder 910. Usable as the physical inventory storage 915 may be a nonvolatile memory such as EEPROM (Electric Erasable Programmable Read Only Memory), flash memory, or FERAM (Ferroelectric Random Access Memory), for instance.

The monitoring control unit 950 reads out PI information kept in the physical inventory storage 915 of the transponder 910 via an assigned wavelength information temporary storage 914, which is a registered or buffered memory. The PI information thus read out is inputted to a transponder assigned wavelength read unit 952 of the monitoring control unit 950, and the transponder assigned wavelength read unit 952 identifies four waveforms assigned to a target transponder 910. It is to be noted that information regarding the four waveforms assigned to the transponder 910 and so forth are recorded in advance in the physical inventory storage 915.

A wavelength setting unit 951 of the monitoring control unit 950 outputs channel information, which is used as actual emission wavelength information on an NB optical module 913 out of the four assigned wavelengths identified by the transponder assigned wavelength read unit 952, to the transponder 910, based on the instructions on the wavelength to be used inputted from an exterior (man-machine interface (MMIF) or the like) such as an operator. The channel information outputted by the wavelength setting unit 951 is one of CH1, CH2, CH3, and CH4, to be exact.

The channel information outputted from the wavelength setting unit 951 is stored temporarily in a wavelength setting information temporary storage 911 of the transponder 910. The wavelength setting information temporary storage 911 is a registered or buffered memory or the like. An NB optical module control unit 912 outputs the channel information stored temporarily in the wavelength setting information temporary storage 911 to the NB optical module which is a four wavelength optical module, and thereby performs emission control so that the NB optical module 913 emits light of a specified wavelength. Note that the NB optical module control unit 912 performs emission control of the NB optical module 913 by conveying a single channel actually used, using a DC signal or a communication scheme of inter-integrated circuit (I2C) or the like.

As shown in FIG. 10, the transmission apparatus 900 is typically structured such that 40 wavelengths are typically handled and transponders 910(1), 910(2), 910(3) and 910(4) are provided, each handling four wavelengths corresponding to their respective four wavelengths. As evident from FIG. 10, ten kinds of transponders 910(1), 910(2), . . . , 910(9) and 910(10) are required in order that the transmission apparatus 900 can support all of 40 wavelengths. The transponders 910 are each of the same structure. That is, the transponders 110 are provided with their corresponding NB optical module control units 912(1), 912(2), . . . , 192(9), 912(10) and their corresponding NB optical modules 913(1), 913(2), . . . , 913(9), 913(10). However, as mentioned above, the four wavelengths at which the NB optical modules 913(1), 913(2), . . . , 913(9), 913(19) differ from the others and are predetermined wavelengths.

Here, if NB optical modules with a full-band tunable laser (FBTL) optical module capable of handling 40 wavelengths using a single module is to be used in substitution for the NB optical module 913 provided in the transponder 910 shown in FIG. 9 and FIG. 10, the wavelengths at which to actually emit light out of the 40 will need to be set. However, what is required of the monitoring control unit 950 is that no major change be made in its control software in particular. Also, it is desirable to keep the existing structure of the transponders 910, namely the structure where there are provided 10 transponders 910 each handling four different wavelengths. Thus, appropriate consistency or compatibility measures need to be taken when the NB optical module 913 is replaced by the NB optical modules with the FBTL optical module capability.

FIRST EMBODIMENT

FIG. 1 is a block diagram conceptually showing a structure of a wavelength division multiplexing (WDM) transmission apparatus according to a first embodiment. In FIG. 1, a transmission apparatus 100 is a wavelength division multiplexing transmission apparatus which includes a transponder 110 for converting light in a wideband to light in a narrowband and a monitoring control unit 150. In FIG. 1, only one transponder 110 is shown for ease of explanation, but in reality the transmission apparatus 100 has a plurality of transponders 110.

The transponder 110 includes a device unit 117, which comprises field programmable gate array (FPGA) or like devices. Main semiconductor devices used to constitute the device unit 117 are programmable logic devices (PLD). The PLD is a kind of semi-custom LSI, that is, a semiconductor device whose logical circuit structure can be changed by programming. It allows shortening of the development and manufacture period, reduction of cost, and specialization for individual applications. The PLDs come in various types such as PAL (Programmable Array Logic), GAL (Generic Array Logic), CPLD (Complex Programmable Logic Device), and FPGA (Field Programmable Gate Array), and any of the types can be used optionally.

In FIG. 1, the transponder 110 sends a signal indicating its installation to the monitoring control unit 150 when the transponder 110 is detachably mounted to the transmission apparatus 100 by plugging the transponder 110 into the transmission apparatus 100 or the like or when the power to the transponder 110 is turned on. The transponder 110 and the monitoring control unit 150 are typically installed attachably and detachably in a casing to constitute the transmission apparatus 100. Therefore, the transponder 110 and the monitoring control unit 150 communicate with each other via not-shown communication units provided respectively therefor.

Upon receipt of the signal of installation, the monitoring control unit 150 reads out physical inventory (PI) information, such as package names and assigned wavelengths, from a physical inventory (hereinafter referred to as "PI" as appropriate) storage 115 provided in the transponder 110. Usable as the physical inventory (PI) storage 115 may be a nonvolatile memory such as EEPROM (Electric Erasable Programmable Read Only Memory), flash memory, or FERAM (Ferroelectric Random Access Memory), for instance.

The monitoring control unit 150 reads out PI information kept in the physical inventory storage 115 of the transponder 110 via an assigned wavelength information temporary storage 114, which is a registered or buffered memory. The PI information thus read out is inputted to a transponder assigned wavelength read unit 152 of the monitoring control unit 150, and the transponder assigned wavelength read unit 152 identifies four waveforms assigned to a target transponder 110. It is to be noted that information regarding the four waveforms assigned to the transponder 110 and so forth are recorded in advance in the physical inventory storage 115.

Here, the transponder 110 is provided with an assigned wavelength determining unit 116 to which the PI information stored temporarily in the assigned wavelength information temporary storage 114, which is a registered or buffered memory, is inputted from the assigned wavelength information temporary storage 114. The assigned wavelength determining unit 116 acquires PI information, such as assigned wavelengths, from the assigned wavelength information temporary storage 114 and recognizes the four wavelength bands which its own transponder 110 must handle. Also, the assigned wavelength determining unit 116 relates the four wavelength bands to channels 1, 2, 3, 4 sequentially from the shortest to longer wavelengths. As a result, the assigned wavelength determining unit 116 associates channels (CH) with the wavelengths corresponding thereto.

A wavelength setting unit 151 of the monitoring control unit 150 outputs channel information, which is used as actual emission information on an FBTL optical module 113 out of the four assigned wavelengths identified by the transponder assigned wavelength read unit 152, to the transponder 110, based on the instructions on the wavelength band to be used inputted from an exterior (man-machine interface (MMIF) or the like) such as an operator. The channel information outputted by the wavelength setting unit 151 is one of CH1, CH2, CH3, and CH4, to be exact.

The channel information is stored temporarily in a wavelength setting information temporary storage 111 of the transponder 110. The wavelength setting information temporary storage 111 is a registered or buffered memory or the like. The assigned wavelength determining unit 116 converts the channel information inputted from the wavelength setting information temporary storage 111 into wavelength information corresponding to the channel, and outputs it as the wavelength information to the FBTL optical module control unit 112.

The FBTL optical module control unit 112 outputs wavelength information concerning the emission wavelength inputted from the assigned wavelength determining unit 116, to the FBTL optical module 113 and thereby performs emission control so that the FBTL optical module 113 emits light of the specified wavelength. Note that the FBTL optical module control unit 112 performs emission control of the FBTL optical module 113 by providing wavelength information for actual light emission, using a DC signal or a communication scheme of inter-integrated circuit (I2C) or the like.

Conventionally, as is clear from the foregoing explanation, the wavelength setting unit 151 makes a specifying input of channel (CH) information, which is used as information on an actual emission wavelength, to the transponder 110. With the FBTL optical module 113, however, there are no specific four wavelengths corresponding to specific four channels. Therefore, as it is, it is not clear which wavelength the specified channel is indicating for light emission. Thus, the assigned wavelength determining unit 116 converts the channel information inputted from the wavelength setting unit 151 in correspondence to specific information on emission wavelength, and outputs it to the FBTL optical module control unit 112.

Also, the assigned wavelength determining unit 116 outputs to the FBTL optical module control unit 112 the wavelength corresponding to the specified channel out of the four assigned wavelengths of the transponder 110 in which the assigned wavelength determining unit 116 itself is installed. As a result, the FBTL optical module 113 emits light at the wavelength specified in emission control from the FBTL optical module control unit 112. Note that, with the conventional NB optical module 913, the relationship between channel and wavelength is prefixed, so that light can be emitted at a specific wavelength corresponding to the channel, solely based on the channel specification.

Figure 2:
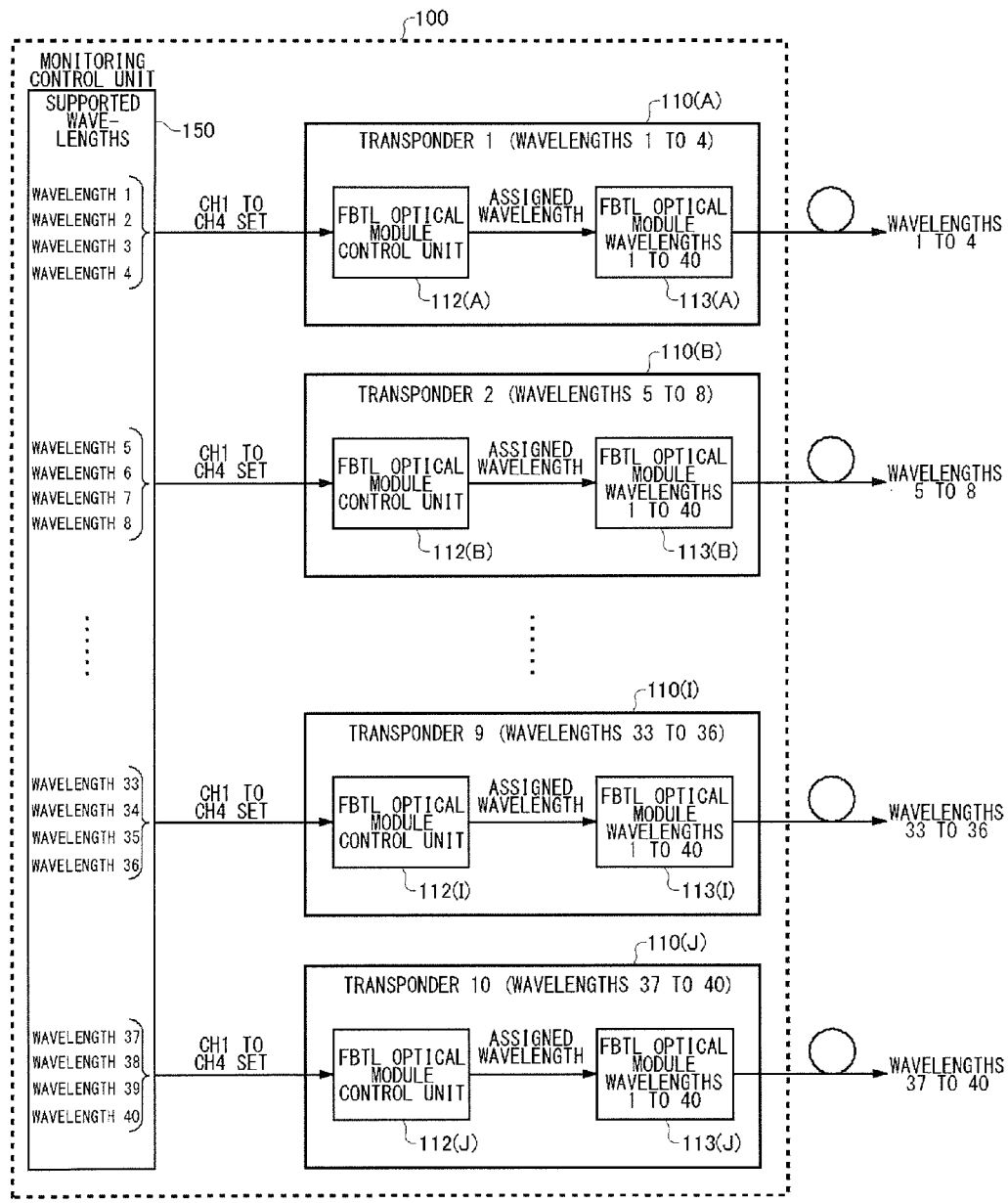
FIG. 2 is an overall conceptual block diagram for explaining a structure of a wavelength division multiplexing transmission apparatus.

FIG. 2 is an overall conceptual block diagram for explaining a structure of the wavelength division multiplexing transmission apparatus. As shown in FIG. 2, with the transmission apparatus 100, as with the transmission apparatus 900, 40 wavelengths are typically handled, for which transponders 110(A), 110(B), . . . , 110(I), 110(J) are provided, each handling four wavelengths corresponding to their respective four wavelengths. It should be noted that the transponders 110(A), 110(B), . . . , 110(I), 110(J) (hereinafter referred to as "transponder 110" or "transponders 110" as appropriate), which are each provided with the FBTL optical module 113, need not be 10 kinds of transponders 110 in order to constitute a transmission apparatus 100 supporting all of the 40 wavelengths. Yet, from the viewpoint of compatibility with the conventional transponders 910, controllability, and the like, it is decided herein that the transmission apparatus 100 provided with FBTL optical modules 113 have 10 kinds of transponders 110.

The transponders 110 are each of the same structure. That is, the transponders 110 are provided with their corresponding FBTL optical module control units 112(A), 112(B), . . . , 112(I), 112(J) and their corresponding FBTL optical modules 113(A), 113(B), . . . , 113(I), 113(J). However, as mentioned above, the four wavelengths handled by each of the FBTL optical modules 113(A), 113(B), . . . , 113(I), 113(J) in the transmission apparatus 100 differ from the others. They are the specific wavelengths predetermined according to the function required of the transmission apparatus 100.

This enables a monitoring control unit 150 to set the NB optical module carrying FBTL for a wavelength at which to actually emit light out of the 40 wavelengths 1 to 40 handled by the transmission apparatus 100.

FIG. 3 is an explanatory diagram for showing an example of correspondence relationship between the 40 wavelengths supported by the transmission apparatus 100, the 10 transponders handling the 40 wavelengths which are divided into groups of 4 wavelengths, and the 4 channels served by each of the transponders.

Figure 4:
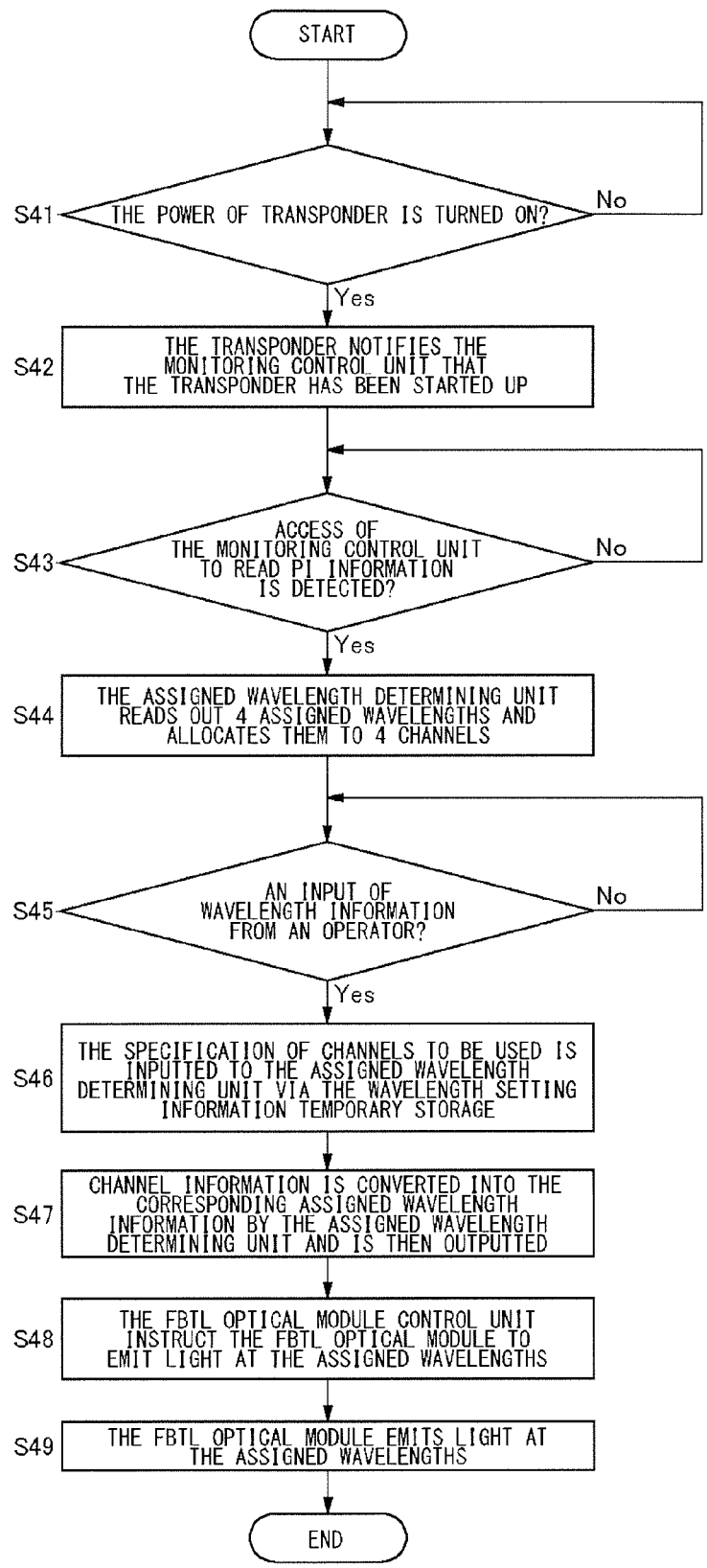
FIG. 4 is a flowchart for conceptually explaining operation processes of a transmission apparatus.

Next, the processes of operation by the transmission apparatus 100 will be explained sequentially using FIG. 4. FIG. 4 is a flowchart for conceptually explaining the operation processes of the transmission apparatus 100.

(Step S41)

The procedure goes to Step S42 when the power to the transponder 110 is turned on or when the transponder 110 is plugged into the transmission apparatus 100. In other words, the procedure goes to Step S42 in a state where the transponder 110 is operably mounted to the transmission apparatus 100.

The procedure waits at Step S41 when the power to the transponder 110 is not turned on and when the transponder 110 is not plugged into the transmission apparatus 100. In other words, the procedure waits at Step S41 if the transponder 110 is not operably mounted to the transmission apparatus 100.

(Step S42)

The transponder 110 notifies the monitoring control unit 150 that the transponder 110 is operably installed. The monitoring control unit 150, which is notified of the operably installed state of the transponder 110, starts to read PI information from the physical inventory storage 115 of the transponder 110. The PI information is typically information on assigned wavelengths, package names, and the like, which are specific information characterizing the transponder 110.

(Step S43)

The transponder 110 detects the access of the monitoring control unit 150 to the physical inventory storage 115 to read the PI information therefrom. The detection of the access to the physical inventory storage 115 to read the PI information therefrom is typically to be done by the assigned wavelength determining unit 116.

The procedure goes on to Step S44 when the transponder 110 has detected the access of the monitoring control unit 150 to the physical inventory storage 115 to read the PI information therefrom. Or the procedure waits at Step S43 if the transponder 110 does not detect the access of the monitoring control unit 150 to the physical inventory storage 115 to read the PI information therefrom.

(Step S44)

The assigned wavelength determining unit 116 reads out the four wavelengths handled by the transponder 110 from the assigned wavelength information temporary storage 114, which is a buffer for temporarily storing PI information when the monitoring control unit 150 reads the PI information from the physical inventory storage 115. Also, the assigned wavelength determining unit 116 allocates and relates the four assigned wavelengths read out from the assigned wavelength information temporary storage 114 to CH1, CH2, CH3 and CH4 sequentially from the shortest to longer wavelengths.

It is to be noted that the correspondence relationship between assigned wavelengths and channels as recognized by the assigned wavelength determining unit 116 is the same as the correspondence relationship at the monitoring control unit 150. As a result, even when the channel to be used only is specified by the monitoring control unit 150, the transponder 110 can recognize the assigned wavelength corresponding to the channel. The assigned wavelength determining unit 116 typically recognizes the correspondence relationship between the assigned four wavelengths and the channel numbers (CH1 to CH4) out of the 40 wavelengths supported by the FBTL optical module 113.

(Step S45)

The monitoring control unit 150 determines whether or not there has been an input of instructions on the wavelength information to be actually used by the transponder 110 from the operator or the like via an external MMIF (man-machine interface), an input device or the like. The procedure goes to Step S46 if there has been an input of instructions on the wavelength information to be actually used by the transponder 110 from the operator or the like. Or the procedure waits at Step S45 if there has not been an input of instructions on the wavelength information to be actually used by the transponder 110 from the operator or the like.

(Step S46)

The monitoring control unit 150 outputs a specification of channels to be used to the transponder 110. The specification of the channels from the monitoring control unit 150 is inputted to the assigned wavelength determining unit 116 via the wavelength setting information temporary storage 111.

(Step S47)

The assigned wavelength determining unit 116 converts the channel specification inputted via the wavelength setting information temporary storage 111 into the corresponding wavelengths, and outputs the emission wavelengths to the FBTL optical module control unit 112. At this point, the conversion of the channel specification to the corresponding wavelengths by the assigned wavelength determining unit 116 is based on the recognition at Step S44.

(Step S48)

The FBTL optical module control unit 112 outputs control instructions such that the FBTL optical module 113 emits light at wavelengths inputted from the assigned wavelength determining unit 116.

(Step S49)

The FBTL optical module 113 outputs optical signals by emitting light at specified assigned wavelengths, based on the control instructions from the FBTL optical module control unit 112.

The transmission apparatus 100 is desirable in that the transmission apparatus 100 not only enables application of the FBTL type NB optical module to the existing transmission apparatuses easily and at low cost, but also requires no preparation of dedicated hardware (FPGA or the like) corresponding to each kind of transponders.

Also, the transmission apparatus 100 utilizes the reading out of the PI information from the physical inventory storage 115, which is constituted by EEPROM or the like, by the monitoring control unit 150 (typically the control program software of the monitoring control unit 150). Accordingly, there is no need for the transponder 110 to access the physical inventory storage 115 on its own, and therefore the transmission apparatus 100 is desirable in that the structural scale of hardware can be reduced and the apparatus can be made small, lightweight and low-cost.

SECOND EMBODIMENT

Figure 5:
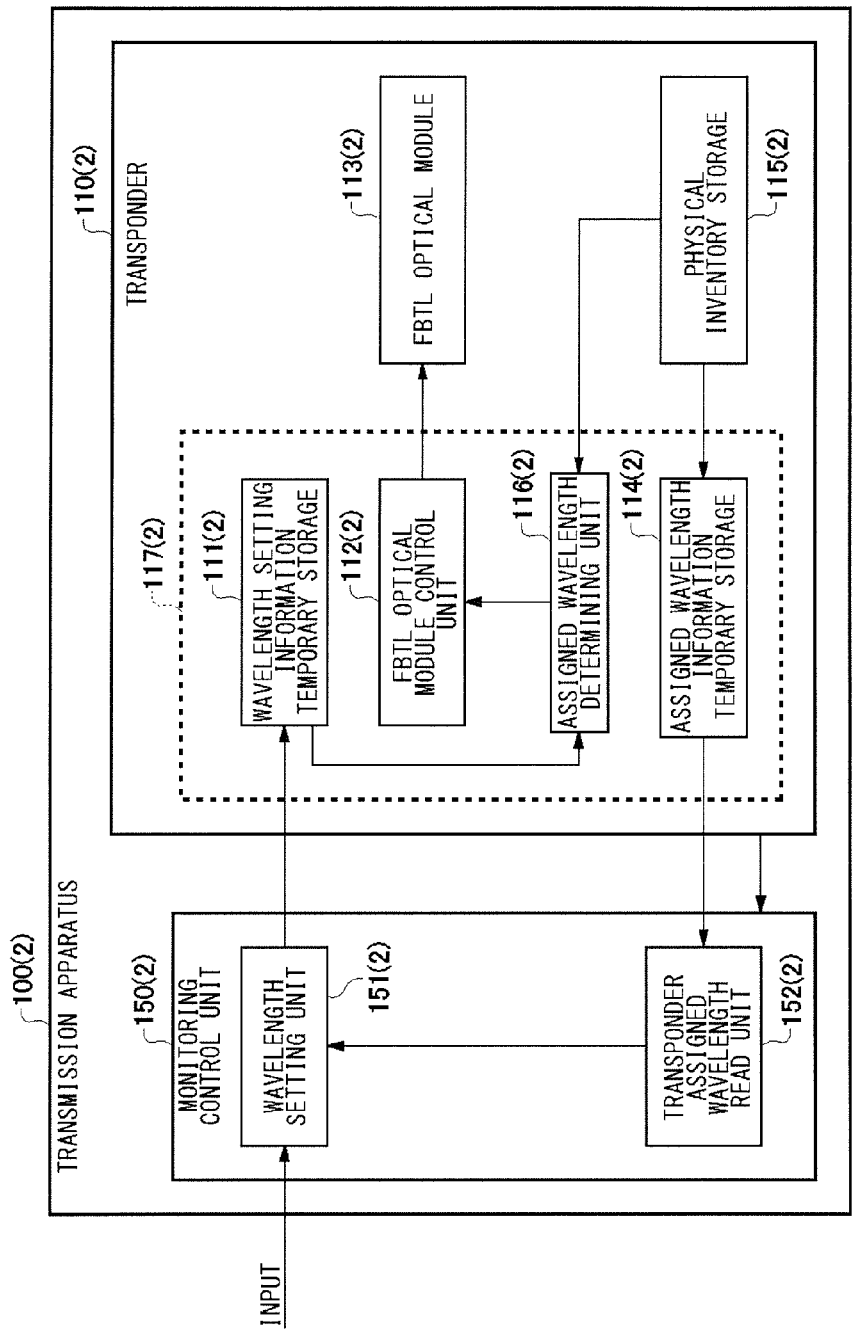
FIG. 5 is a block diagram conceptually showing a structure of a wavelength division multiplexing transmission apparatus according to a second embodiment.

FIG. 5 is a block diagram conceptually showing a structure of the wavelength division multiplexing transmission apparatus according to a second embodiment. In FIG. 5, a transmission apparatus 100(2) is a wavelength division multiplexing transmission apparatus which includes a transponder 110(2) for converting light in a wideband to light in a narrowband and a monitoring control unit 150(2) for monitoring and controlling the transponder 110(2). In FIG. 5, only one transponder 110(2) is shown for ease of explanation, but in reality the transmission apparatus 100(2) has a plurality of transponders 110(2). Though the transmission apparatus 100(2) partially shares the same components and operations as those of the transmission apparatus 100, the structural components and operations of the transmission apparatus 100(2) will be hereunder described in detail to avoid misunderstanding.

The transponder 110(2) includes a device unit 117(2), which comprises field programmable gate array (FPGA) or like devices. Assume herein that the device unit 117(2) includes a wavelength setting information temporary storage 111(2), an FBTL optical module control unit 112(2), an assigned wavelength determining unit 116(2), and an assigned wavelength information temporary storage 114(2).

In FIG. 5, the transponder 110(2) sends a signal indicating its installation to the monitoring control unit 150(2) when the transponder 110(2) is detachably mounted to the transmission apparatus 100(2) by plugging the transponder 110(2) into the transmission apparatus 100(2) or the like or when the power to the transponder 110(2) is turned on. The transponder 110(2) and the monitoring control unit 150(2) are typically installed attachably and detachably in a casing to constitute the transmission apparatus 100(2). Therefore, the transponder 110(2) and the monitoring control unit 150(2) communicate with each other via not-shown communication units provided respectively therefor.

Upon receipt of the signal of installation, the monitoring control unit 150(2) reads out PI information, such as package names and assigned wavelengths, from a physical inventory storage 115(2) provided in the transponder 110(2).

The monitoring control unit 150(2) reads out PI information kept in the physical inventory storage 115(2) of the transponder 110(2) via an assigned wavelength information temporary storage 114(2), which is a registered or buffered memory. The PI information thus read out is inputted to a transponder assigned wavelength read unit 152(2) of the monitoring control unit 150(2), and the transponder assigned wavelength read unit 152(2) identifies four waveforms assigned to a target transponder 110(2). It is to be noted that information regarding the four waveforms assigned to the transponder 110(2) and so forth are recorded in advance in the physical inventory storage 115(2).

The transponder 110(2) includes the assigned wavelength determining unit 116(2) that autonomously reads the PI information from the physical inventory storage 115(2) when the transponder 110(2) is operably mounted to the transmission apparatus 100(2). When the power to the transponder 110(2) is turned on, the assigned wavelength determining unit 116(2) acquires the PI information from the physical inventory storage 115(2) and recognizes the four wavelength bands which its own transponder 110(2) must handle. Also, the assigned wavelength determining unit 116(2) relates the four wavelength bands to channels 1, 2, 3, 4 sequentially from the shortest to longer wavelengths. As a result, the assigned wavelength determining unit 116(2) associates channel numbers (CH numbers) with the wavelengths corresponding thereto.

A wavelength setting unit 151(2) of the monitoring control unit 150(2) outputs channel information, which is used as actual emission wavelength information on an FBTL optical module 113(2) out of the four assigned wavelengths identified by the transponder assigned wavelength read unit 152(2), to the transponder 110(2), based on the instructions on the wavelength band to be used inputted from the exterior (MMIF or the like) such as an operator. The channel information outputted by the wavelength setting unit 151 is one of CH1, CH2, CH3, and CH4, to be exact.

The channel information is stored temporarily in a wavelength setting information temporary storage 111(2) of the transponder 110(2). The wavelength setting information temporary storage 111(2) is a registered or buffered memory or the like. The assigned wavelength determining unit 116(2) converts the channel information inputted from the wavelength setting information temporary storage 111(2) into wavelength information corresponding to the channel, and outputs it as the wavelength information to the FBTL optical module control unit 112(2).

The FBTL optical module control unit 112(2) outputs wavelength information concerning the emission wavelength inputted from the assigned wavelength determining unit 116(2), to the FBTL optical module 113(2) and thereby performs emission control so that the FBTL optical module 113(2) emits light of the specified wavelength. Note that the FBTL optical module control unit 112(2) performs emission control of the FBTL optical module 113(2) by providing wavelength information for actual light emission, using a DC signal or a communication scheme of inter-integrated circuit (I2C) or the like.

Conventionally, as is clear from the foregoing explanation, the wavelength setting unit 151(2) makes a specifying input of channel (CH) information, which is used as information on an actual emission wavelength, to the transponder 110(2). With the FBTL optical module 113(2), however, there are no specific four wavelengths corresponding to specific four channels. Therefore, as it is, it is not clear which wavelength the specified channel is indicating for light emission. Thus, the assigned wavelength determining unit 116(2) converts the channel information inputted from the wavelength setting unit 151(2) into specific information on emission wavelength, and outputs it to the FBTL optical module control unit 112(2).

Also, the assigned wavelength determining unit 116(2) outputs to the FBTL optical module control unit 112(2) the wavelength corresponding to the specified channel out of the four assigned wavelengths of the transponder 110(2) in which the assigned wavelength determining unit 116 itself is installed. As a result, the FBTL optical module 113(2) emits light at the wavelength specified in emission control from the FBTL optical module control unit 112(2). Note that, with the conventional NB optical module 913, the relationship between channel and wavelength is prefixed, so that light can be emitted at a specific wavelength corresponding to the channel, solely based on the channel specification.

Figure 6:
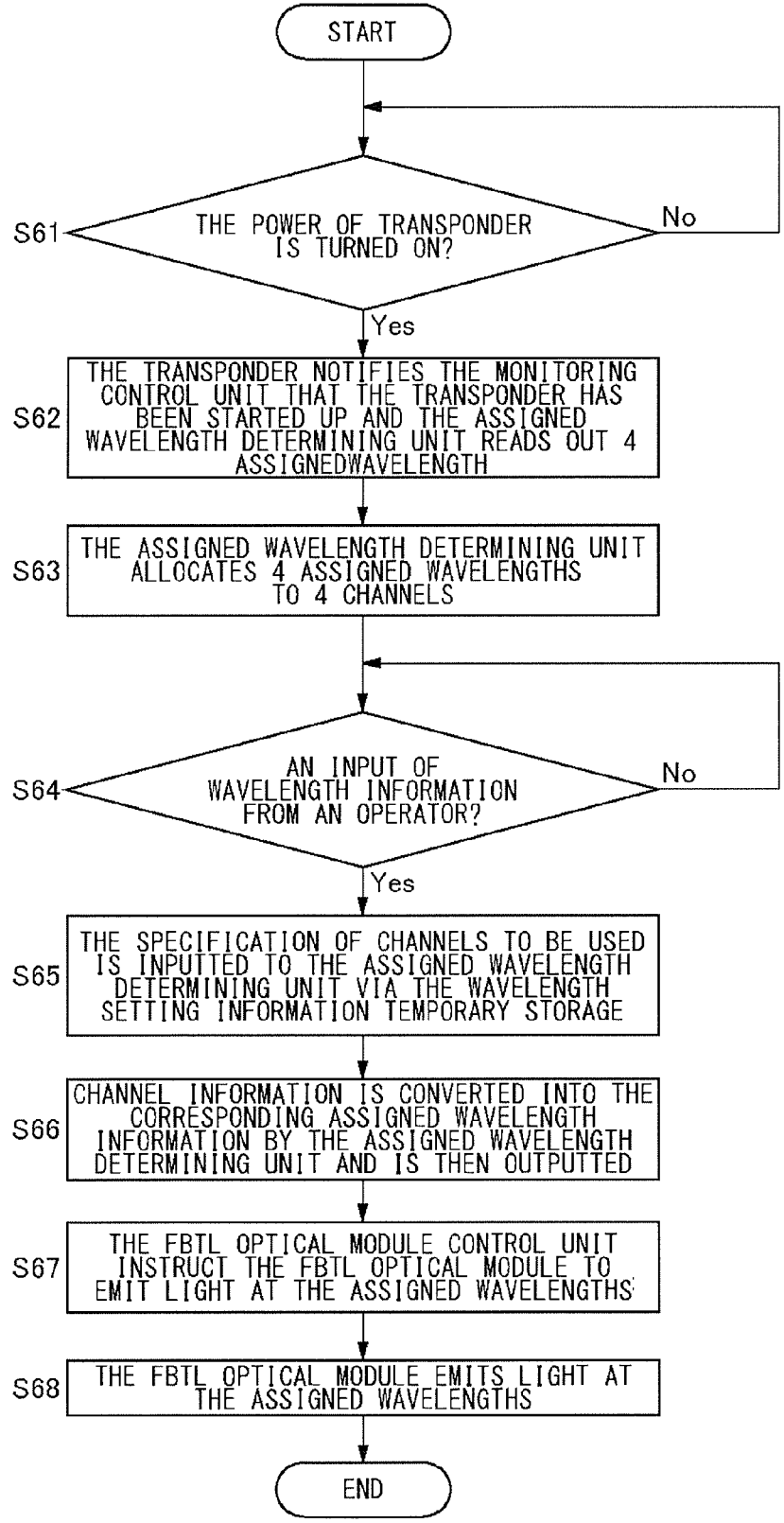
FIG. 6 is a flowchart for conceptually explaining operation processes of a transmission apparatus according to a second embodiment.

Next, the processes of operation by the transmission apparatus 100(2) will be explained sequentially using FIG. 6. FIG. 6 is a flowchart for conceptually explaining the operation processes of the transmission apparatus 100(2).

(Step S61)

The procedure goes to Step S62 when the power to the transponder 110(2) is turned on or when the transponder 110(2) is plugged into the transmission apparatus 100(2). In other words, the procedure goes to Step S62 in a state where the transponder 110(2) is operably mounted to the transmission apparatus 100(2).

The procedure waits at Step S61 when the power to the transponder 110(2) is not turned on and when the transponder 110(2) is not plugged into the transmission apparatus 100(2). In other words, the procedure waits at Step S61 if the transponder 110(2) is not operably mounted to the transmission apparatus 100(2).

(Step S62)

The transponder 110(2) notifies the monitoring control unit 150(2) that the transponder 110(2) is operably installed. The monitoring control unit 150(2), which is notified of the operably installed state of the transponder 110(2), starts to read PI information from the physical inventory storage 115(2) of the transponder 110(2). The PI information is typically information on assigned wavelengths, package names, and the like, which are specific information characterizing the transponder 110(2).

Also, the assigned wavelength determining unit 116(2) of the transponder 110(2) reads out the four assigned wavelengths from the physical inventory storage 115(2) without waiting for any instructions from the monitoring control unit 150(2).

(Step S63)

After having read out the four assigned wavelengths, which the transponder 110(2) handles, from the physical inventory storage 115(2), the assigned wavelength determining unit 116(2) allocates and relates the four assigned wavelengths read out therefrom to CH1, CH2, CH3 and CH4 sequentially from the shortest to longer wavelengths.

It is to be noted that the correspondence relationship between assigned wavelengths and channels as recognized by the assigned wavelength determining unit 116(2) is the same as the correspondence relationship at the monitoring control unit 150(2). As a result, even when the channel to be used only is specified by the monitoring control unit 150(2), the transponder 110(2) can recognize the assigned wavelength corresponding to the channel. The assigned wavelength determining unit 116(2) typically recognizes the correspondence relationship between the assigned four wavelengths and the channel numbers (CH1 to CH4) out of the 40 wavelengths supported by the FBTL optical module 113(2).

(Step S64)

The monitoring control unit 150(2) determines whether or not there has been an input of instructions on the wavelength information to be actually used by the transponder 110 from the operator or the like via an external MMIF, an input device or the like. The procedure goes to Step S65 if there has been an input of instructions on the wavelength information to be actually used by the transponder 110(2) from the operator or the like. Or the procedure waits at Step S64 if there has not been an input of instructions on the wavelength information to be actually used by the transponder 110(2) from the operator or the like.

(Step S65)

The monitoring control unit 150(2) outputs a specification of channels to be used to the transponder 110(2). The specification of the channels from the monitoring control unit 150(2) is inputted to the assigned wavelength determining unit 116(2) via the wavelength setting information temporary storage 111(2).

(Step S66)

The assigned wavelength determining unit 116(2) converts the channel specification inputted via the wavelength setting information temporary storage 111(2) into the corresponding wavelengths, and outputs the emission wavelengths to the FBTL optical module control unit 112(2). At this point, the conversion of the channel specification to the corresponding wavelengths by the assigned wavelength determining unit 116(2) is based on the recognition at Step S63.

(Step S67)

The FBTL optical module control unit 112(2) outputs control instructions such that the FBTL optical module 113(2) emits light at wavelengths inputted from the assigned wavelength determining unit 116(2).

(Step S68)

The FBTL optical module 113(2) outputs optical signals by emitting light at specified assigned wavelengths, based on the control instructions from the FBTL optical module control unit 112(2).

The hardware (e.g., FPGA) of the transponder 110(2) autonomously reads out the PI information and identifies it without relying on any instructions from the monitoring control unit 150(2) and/or the operation. Hence, there is no need to comply with the readout procedure performed by the monitoring control unit 150(2) and the readout timing of the monitoring control unit 150(2). Accordingly, in conjunction with the power-on of the transponder 110(2), the assigned wavelength determining unit 116(2) promptly associates the four wavelengths to be handled by its own transponder 110(2) with the channel numbers (CH1 to CH4) and recognizes them, which is therefore desirable.

Also, the transmission apparatus 100(2) does not need to accurately detect the access of the monitoring control unit 150(2) to the physical inventory storage 115(2) to read the PI information. Thus, the transmission apparatus 100(2) does not need to construct a complex FPGA hardware or the like compatible with all kinds of readout formats, even in the case of access from the monitoring control unit 150(2) having a plurality of readout formats including I2C or the like, for instance.

THIRD EMBODIMENT

Figure 7:
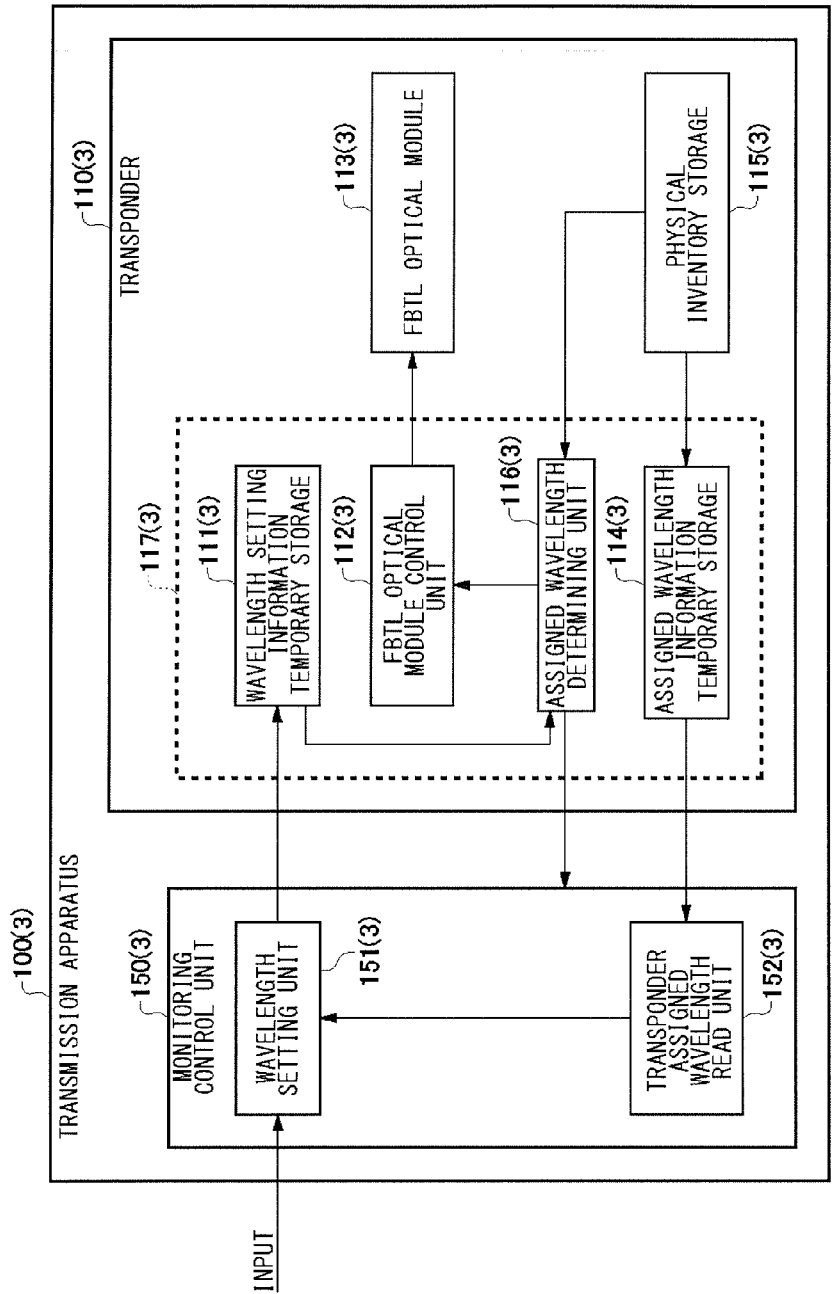
FIG. 7 is a block diagram conceptually showing a structure of a wavelength division multiplexing transmission apparatus according to a third embodiment.

FIG. 7 is a block diagram conceptually showing a structure of the wavelength division multiplexing transmission apparatus according to a third embodiment. In FIG. 7, a transmission apparatus 100(3) is a wavelength division multiplexing transmission apparatus which includes a transponder 110(3) for converting light in a wideband to light in a narrowband and a monitoring control unit 150(3). In FIG. 7, only one transponder 110(3) is shown for ease of explanation, but in reality the transmission apparatus 100(3) has a plurality of transponders 110(3).

The transmission apparatus 100(3) has the same structural components and operations as those of the transmission apparatus 100(2) excepting the feature in which the timing with which the transponder 110(2) is operably mounted to the transmission apparatus 100(2) is delayed until such time when a predetermined condition has been met. Thus, the same reference numerals are given to such similar components and the repeated and detailed description thereof is avoided herein.

In FIG. 7, after the assigned wavelength determining unit 116(3) has completed reading the PI information from the physical inventory storage 115(3), the transponder 110(3) sends a signal indicating its installation to the monitoring control unit 150(3) when the transponder 110(3) is detachably mounted to the transmission apparatus 100(3) by plugging the transponder 110(3) into the transmission apparatus 100(3) or the like or when the power to the transponder 110(3) is turned on. Thus, the assigned wavelength determining unit 116(3) itself can notify the monitoring control unit 150(3) of the installation (hookup) status after the reading process has been completed.

In other words, the monitoring control unit 150(3) does not recognize the installation of the transponder 110(3) before the assigned wavelength determining unit 116(3) has completed reading the PI information from the physical inventory storage 115(3).

The transponder 110(3) and the monitoring control unit 150(3) are typically installed attachably and detachably in a casing to constitute the transmission apparatus 100(3). Therefore, the transponder 110(3) and the monitoring control unit 150(3) may communicate with each other via not-shown communication units provided respectively therefor.

Upon receipt of the signal of installation, the monitoring control unit 150(3) reads out the PI information, such as package names and assigned wavelengths, from the physical inventory storage 115(3) provided in the transponder 110(3). In this case, the assigned wavelength determining unit 116(3) has already read out the PI information from the physical inventory storage 115(3). Thus, a read access of the monitoring control unit 150(3) to the physical inventory storage 115 (3) and a read access of the assigned wavelength determining unit 116(3) to the physical inventory storage 115(3) do not overlap with each other. As a result, the transmission apparatus 100(3) that reduces the concern about the possibility of failures like a hang-up and interferences is achieved.

Conventionally, as is clear from the foregoing explanation, the wavelength setting unit 151(3) makes a specifying input of channel (CH) information, which is used as information on an actual emission wavelength, to the transponder 110(3). With the FBTL optical module 113(3), however, there are no specific four wavelengths corresponding to specific four channels. Therefore, as it is, it is not clear which wavelength the specified channel is indicating for light emission. Thus, the assigned wavelength determining unit 116(3) converts the channel information inputted from the wavelength setting unit 151(3) into specific information on emission wavelength, and outputs it to the FBTL optical module control unit 112(3).

Also, the assigned wavelength determining unit 116(3) outputs to the FBTL optical module control unit 112(3) the wavelength corresponding to the specified channel out of the four assigned wavelengths of the transponder 110(3) in which the assigned wavelength determining unit 116(3) itself is installed. As a result, the FBTL optical module 113(3) emits light at the wavelength specified in emission control from the FBTL optical module control unit 112(3). Note that, with the conventional NB optical module 913, the relationship between channel and wavelength is prefixed, so that light can be emitted at a specific wavelength corresponding to the channel, solely based on the channel specification.

Figure 8:
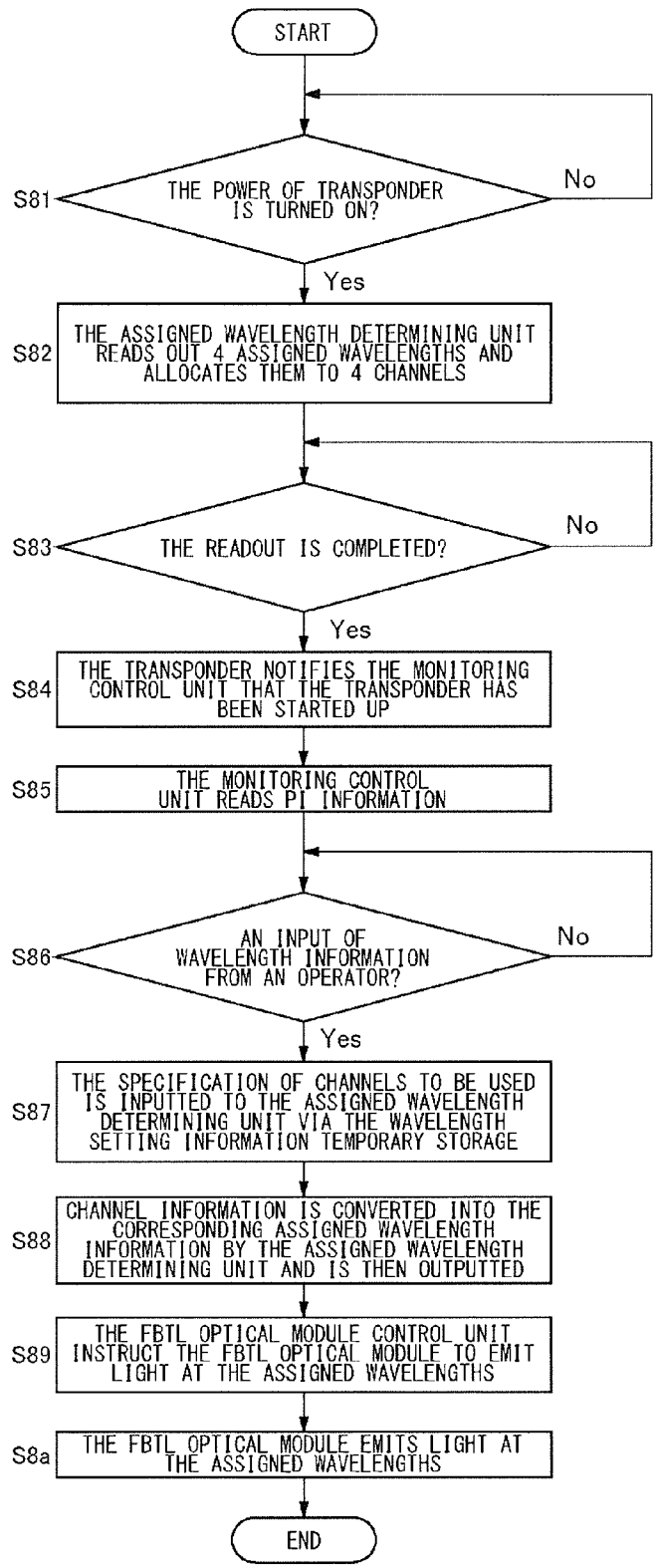
FIG. 8 is a flowchart for conceptually explaining operation processes of a transmission apparatus.

Next, the processes of operation by the transmission apparatus 100(3) will be explained sequentially using FIG. 8. FIG. 8 is a flowchart for conceptually explaining the operation processes of the transmission apparatus 100(3).

(Step S81)

The procedure goes to Step S82 when the power to the transponder 110(3) is turned on or when the transponder 110(3) is plugged into the transmission apparatus 100(3). In other words, the procedure goes to Step S82 in a state where the transponder 110(3) is operably mounted to the transmission apparatus 100(3).

The procedure waits at Step S81 when the power to the transponder 110(3) is not turned on and when the transponder 110(3) is not plugged into the transmission apparatus 100(3). In other words, the procedure waits at Step S81 if the transponder 110(3) is not operably mounted to the transmission apparatus 100(3).

(Step S82)

The assigned wavelength determining unit 116(3) of the transponder 110(3) reads out the four assigned wavelengths from the physical inventory storage 115(3) without waiting for any instructions from the monitoring control unit 150(3).

(Step S83)

The assigned wavelength determining unit 116(3) determines whether the reading process of reading out the PI information from the physical inventory storage 115(3) has been completed or not. The procedure goes to Step S84 if it is determined that the reading process of reading out the PI information from the physical inventory storage 115(3) has been completed. The procedure waits at Step S83 if it is not determined that the reading process of reading out the PI information from the physical inventory storage 115(3) has been completed.

(Step S84)

The transponder 110(3) notifies the monitoring control unit 150(3) that the transponder 110(3) is operably installed.

(Step S85)

The monitoring control unit 150(3), which is notified of the operably installed state of the transponder 110(3), starts to read PI information from the physical inventory storage 115 (3) of the transponder 110(3). The PI information is typically information on assigned wavelengths, package names, and the like, which are specific information characterizing the transponder 110(3).

(Step S86)

Step S86 corresponds to the above-described Step S64 and therefore the repeated description thereof is omitted here.

(Step S87)

Step S87 corresponds to the above-described Step S65 and therefore the repeated description thereof is omitted here.

(Step S88)

Step S88 corresponds to the above-described Step S66 and therefore the repeated description thereof is omitted here.

(Step S89)

Step S89 corresponds to the above-described Step S67 and therefore the repeated description thereof is omitted here.

(Step S8*a*)

Step S8*a* corresponds to the above-described Step S68 and therefore the repeated description thereof is omitted here.

By employing the transmission apparatus 100(3), avoided is the overlapping of a read access of the monitoring control unit 150(3) to the physical inventory storage 115(3) to read the PI information therefrom and a read access of the assigned wavelength determining unit 116(3) (namely, an autonomous access of the transponder 110(3) itself) to the physical inventory storage 115(3) to read the PI information. Thus, it is possible to avoid the collision of accesses, thereby realizing a smooth, which is further desirable In the description of the third embodiment, a description has been given of an example where the signal of installation is sent to the monitoring control unit 150(3) after the completion of the reading process in which the assigned wavelength determining unit 116(3) reads out the PI information from the physical inventory storage 115(3). However, the description of the third embodiment is not limited to this operation process and structure. For example, the dispatch of the signal of installation to the monitoring control unit 150(3) is delayed by a predetermined readout processing time required by the assigned wavelength determining unit 116(3), by the use of a not-shown delay circuit or the like, for instance, in such a manner as to avoid the overlapping of a read access of the monitoring control unit 150(3) to the physical inventory storage 115(3) to read the PI information therefrom and a read access of the assigned wavelength determining unit 116(3) (namely, an autonomous access of the transponder 110(3) itself) to the physical inventory storage 115(3) to read the PI information.

Also, the signal of installation may be sent from the transponder 110(3) to the monitoring control unit 150(3) without any delay. And the monitoring control unit 150(3), which has received the signal of installation, performs the read access to the physical inventory storage 115(3) to read the PI information after the monitoring control unit 150(3) waits for the length of time required for the reading done by the assigned wavelength determining unit 116(3).

The transmission apparatuses 100, 100(2) and 100(3) exemplified in the present embodiments may change their structural components and operation processes as appropriate within an obvious range.

INDUSTRIAL APPLICABILITY

The present invention can be used in a wavelength division multiplexing transmission apparatus and for the wavelength control of the wavelength division multiplexing transmission apparatus.

What is claimed is:

1. A wavelength division multiplexing transmission apparatus including a plurality of transponders for converting optical signals from wideband wavelengths to narrowband wavelengths, and a monitoring control unit for controlling the transponders, each of the transponders comprising:
    an assigned wavelength determining unit configured to convert channel information specified by the monitoring control unit to assigned wavelength information assigned to the transponder;
    a full-band tunable laser (FBTL) optical module control unit configured to control a full-band tunable laser (FBTL) optical module in such a manner as to output the optical signal, based on the assigned wavelength information after conversion by the assigned wavelength determining unit; and
    a physical inventory (PI) storage in which the assigned wavelength information is recorded in advance,
        wherein in response to the transponder starting up, the assigned wavelength determining unit is configured to associate the channel information with the assigned wavelength information by reading the assigned wavelength information from the PI storage,
        wherein the assigned wavelength determining unit is configured to read the assigned wavelength information from the PI storage prior to the monitoring control unit reading the assigned wavelength information from the PI storage for avoiding overlapping of read accesses to the PI storage by the monitoring control unit and the assigned wavelength determining unit.

2. A method for controlling a wavelength of a wavelength division multiplexing transmission apparatus including (i) a plurality of transponders for converting optical signals from wideband wavelengths to narrowband wavelengths, each transponder provided with a physical inventory (PI) storage in which an assigned wavelength information is recorded in advance, and (ii) a monitoring control unit for controlling the transponders, the method comprising:
    an assigned wavelength determining process of converting channel information specified by the monitoring control unit to assigned wavelength information assigned to the transponder, the assigned wavelength determining process being performed by each of the transponders;
    a full-band tunable laser (FBTL) optical module control process of controlling a full-band tunable laser (FBTL) optical module in such a manner as to output the optical signal, based on the assigned wavelength information after conversion in the assigned wavelength determining process, the FBTL optical module control process being performed by each of the transponders;
    a first read process of reading, by an assigned wavelength determining unit, the assigned wavelength information from the PI storage in response to the transponder starting up, for associating the channel information with the assigned wavelength information; and
    a second read process of reading, by the monitoring control unit, the assigned wavelength information from the PI storage, after the first read process.

* * * * *